(12) United States Patent
Wang et al.

(10) Patent No.: US 9,378,403 B2
(45) Date of Patent: Jun. 28, 2016

(54) METHOD OF USING CAMERA SENSOR INTERFACE TO TRANSFER MULTIPLE CHANNELS OF SCAN DATA USING AN IMAGE FORMAT

(75) Inventors: Ynjiun Paul Wang, Cupertino, CA (US); Tao Xian, Bordentown, NJ (US); Michael Vincent Miraglia, Hamilton, NJ (US); Timothy Williams, Northport, NY (US); Duane Ellis, San Diego, CA (US); James Nahill, Turnersville, NJ (US); Yong Liu, Jiangsu (CN); Patrick Anthony Giordano, Glassboro, NJ (US); David Wilz, Sewell, NJ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 14/379,057

(22) PCT Filed: Mar. 1, 2012

(86) PCT No.: PCT/CN2012/071818
§ 371 (c)(1),
(2), (4) Date: Nov. 3, 2014

(87) PCT Pub. No.: WO2013/127083
PCT Pub. Date: Sep. 6, 2013

(65) Prior Publication Data
US 2015/0053768 A1    Feb. 26, 2015

(51) Int. Cl.
*G06K 7/10* (2006.01)
*G06K 7/14* (2006.01)

(52) U.S. Cl.
CPC ........ *G06K 7/10821* (2013.01); *G06K 7/10554* (2013.01); *G06K 7/1404* (2013.01); *G06K 7/1413* (2013.01); *G06K 7/1417* (2013.01)

(58) Field of Classification Search
CPC ... G06K 7/14; G06K 7/1417; G06K 7/10722; G06K 10/811; G06K 7/10851; G06K 9/228
USPC ............... 235/462.1, 462.11, 462.24, 462.25; 382/305
See application file for complete search history.

(56) References Cited

U.S. PATENT DOCUMENTS

| | | | |
|---|---|---|---|
| 5,942,741 A | 8/1999 | Longacre, Jr. et al. | |
| 7,925,048 B2 | 4/2011 | Kinoshita | |
| 8,081,849 B2 * | 12/2011 | King ...................... | G06K 9/228 382/305 |
| 2003/0033458 A1 | 2/2003 | Chen | |

FOREIGN PATENT DOCUMENTS

| | | |
|---|---|---|
| CN | 2530415 Y | 1/2003 |
| CN | 101038623 A | 9/2007 |
| KR | 20030006309 A | 1/2003 |
| KR | 20040108622 A | 12/2004 |

OTHER PUBLICATIONS

International Search Report for PCT/CN2012/071818 dated Dec. 13, 2012, 11 pages.

* cited by examiner

*Primary Examiner* — Karl D Frech
(74) *Attorney, Agent, or Firm* — Additon, Higgins & Pendleton, P.A.

(57) ABSTRACT

A computer system for decoding a signal of decodable indicia. The computer system includes a laser scanner configured that outputs a signal of decodable indicia and a microprocessor that include a camera sensor interface that is configured to receive the signal from the laser scanner.

19 Claims, 4 Drawing Sheets

METHOD OF USING CAMERA SENSOR INTERFACE TO TRANSFER MULTIPLE CHANNELS OF SCAN DATA USING AN IMAGE FORMAT

FIELD OF INVENTION

The present invention provides a system and method for increasing the decoding speed when decoding images of decodable indicia, such as bar codes, with a terminal.

BACKGROUND OF INVENTION

Bar codes are graphical representations of data, images of decodable indicia, the most common of which are referred to as one dimensional (1D) and two dimensional (2D) bar codes. 1D bar codes are images that represent data by varying the widths and spacings of parallel lines. 2D bar codes are also images that represent data, but in addition to the parallel lines, or bars, a 2D bar code may contain rectangles, dots, hexagons and other geometric patterns in two dimensions. A common example of a 2D bar code is a Quick Response (QR) code. QR codes consist of black modules arranged in a square pattern on a white background. The data encoded in bar codes are interpreted by optical scanners and/or software.

Bar codes were first scanned by special optical scanners called bar code readers; later, scanners and interpretive software became available on devices, including desktop printers and smart phones. Today, devices considered bar code readers include, but are not limited to: pen-type readers, laser scanners, CCD readers, camera-based readers, omni-directional bar code scanners, and cell phone cameras.

Some of the leading manufacturers of mobile devices offer bar code scanning software that can be installed on their respective devices. The goal of this software is to allow consumers to use their mobile devices to scan bar codes that they encounter, including, but not limited to, those on products in stores or on advertisements for products and/or services located in media such as magazines and posted in public places, such as bus stops.

Rather than integrating a laser scanner into a mobile device, mobile device manufacturers rely on the camera in the device to capture the image before it is processed, i.e., decoded by the software installed on the phone or remotely accessible to the phone via a network connection.

Mobile terminals (e.g., encoded information reading (EIR) terminals configured to read bar codes and/or other types of encoded information) waste time and processing power transferring bar code scan data from their electronic circuitry to their processors. When multiple scan channels are decoded, both the hardware and the software utilized in this process present limitations.

After a bar code is scanned, especially when using a high speed bar code scanner, consisting of multiple scan channels, the signal processing is distributed over the whole system architecture. In this situation, pre-processing of the bar code is handled by the hardware. Before the processing can occur, the scanned data is read into a main processor for decoding.

The interface that reads the data into the processor that handles decoding in an EIR terminals, is used in parallel for other operations within the EIR terminal, such as accessing data or instruction memory. The multi-tasking of this interface reduces the rate at which the scanned data can be read into the processor.

Additionally, the processor only reads the data once a predetermined threshold of data has been reached. To determine whether there is enough data to commence processing, the processor polls the external device to collect the scanned data. The processor requires time to poll the external device constantly, which reduces the time available for decoding.

Finally, when sufficient data has accumulated to be read by the processor, the processor evaluates the data in order to find regions that appear to be the start and stop of a barcode. The processor searched through each piece of data to identify these regions which adds further overhead to the decoding process.

A need exists for a system and method to utilize the hardware in an EIR terminal efficiently when decoding bar coded data.

SUMMARY OF INVENTION

An object of the present invention is to increase scan rates in an EIR terminal by moving data to the processor with less overhead so the processor can dedicate most of its time to performing the decoding algorithms instead of using this time transferring barcode data from the external circuitry.

Another object of the present invention is to utilize the camera sensor interface (CSI) for laser signal collection. The utilization of this interface by a laser signal, instead of only a CMOS (complementary metal-oxide-semiconductor) camera, integrates the heightened performance of image scanning with a laser scanner, into a hand held device, such as an EIR terminal.

The present invention enables the CSI to collect laser signals. The present invention enables laser scan data to be placed directly into the processor's memory space with reduced overhead. This is accomplished by pushing data to the processor at fixed time intervals using the CSI. Additionally, the data is packaged into well defined image frames along with the header information, allowing the processor to identify quickly if the data should be processed and if so, which elements should be processed together.

In an embodiment of the present invention, the data collected from multiple imaging channels on the scanning portion of an EIR terminal is preprocessed in hardware, including but not limited to a field programmable gate array (FPGA) and routed for further processing and/or decoding through the camera sensor interface (CSI).

In an embodiment of the present invention, the data collected by the scanner, including but not limited to laser data, are pushed from the external hardware to the processor for decoding. The pushes occur at fixed time intervals. Pushing the data at fixed intervals eliminates the need for the processor to poll the external hardware for data. Thus, the processor time used to determine the availability of data can be allocated to other tasks within the EIR terminal.

In an embodiment of the present invention, data are sent using the camera sensor interface (CSI) available on many application processors. Rather than use an interface that is multi-tasking and used for other types of processing, these interfaces are often independent of the general purpose memory busses and therefore utilizing these interfaces allows for high speed data transfer. Additionally, these interfaces typically work in conjunction with a data memory access (DMA) controller. A DMA controller can access memory without utilizing the processor, so this method allows the incoming data on the CSI to be placed into defined memory buffers, by the DMA controller, with very little processor intervention.

In an embodiment of the present invention, data from the various channels are packed and sent out as single images. These images contain barcode data as well as header information, which can be used by the processor to make a fast determination of whether or not this data should be processed. If the data is to be processed, the header information can also define the start and stop of the barcode segments (i.e., envelops).

Although the discussed embodiments concern scanning bar code images using optical scanning apparatus, one of skill in the art will recognize that the methodology of the present invention can be extended to other multiple channel imaging systems by preprocessing information in the hardware and using an interface similar to the CSI to send this information to a microprocessor for decoding.

DETAILED DESCRIPTION OF THE INVENTION

The present invention provides a system and method for increasing the decoding speed when decoding images of decodable indicia, such as bar codes, with a terminal, such as an EIR terminal.

The present invention enables laser scan data to be placed directly into the processor's memory space with reduced overhead. At least one of three approaches is utilized to increase the decoding speed: 1) the CSI is utilized to place laser scan data into defined memory buffers; 2) laser data is pushed from the external hardware to the decoding processor at fixed time intervals; and 3) laser data is packaged into defined image frames and transmitted with header information.

In an embodiment of the present invention, the external hardware used for the signal processing within the EIR terminal sends the data to the processor, emulating a camera senor interface, by performing the following functions: 1) reading data from each of the laser channels into memory; 2) packaging this data into an image frame; and 3) pushing data to be processed at consistent fixed time intervals. In this manner, the CSI is utilized doe laser scanning signal collection.

Figure 1:
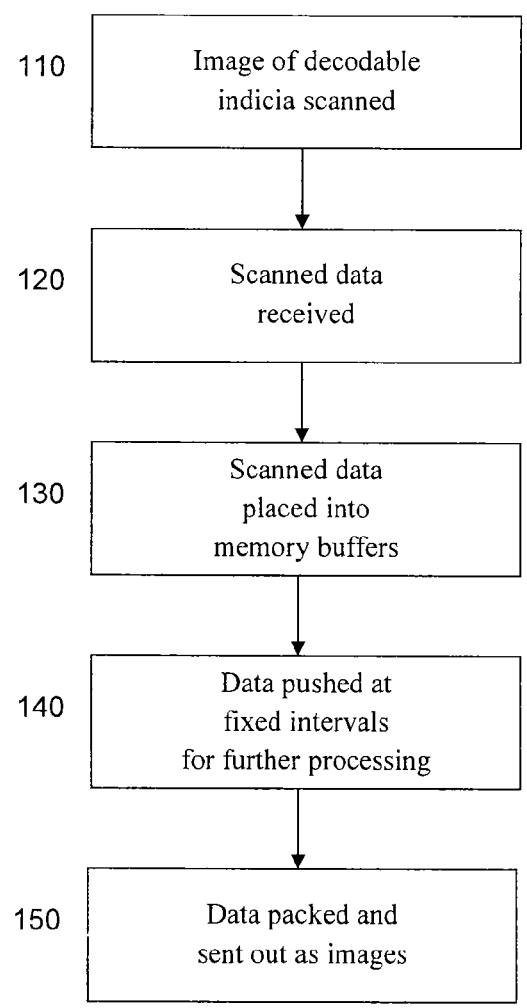
FIG. 1 depicts workflow of an embodiment of the present invention.

FIG. 1 is a workflow 100 of an embodiment of the present invention. In this embodiment, the EIR terminal includes an optical scanning device. The optical scanning device is used to scan an image of decodable indicia 110. The scanned data is received by the EIR terminal 120 and placed into defined memory buffers 130 by hardware components, including but not limited to a direct access memory (DMA) controller, and/or by a software routine, computer program instructions executed on a processor. If software is employed for this task, the storage location of the code includes, but is not limited to, the internal processor of an EIR terminal, a server accessible to the EIR terminal via an Internet connection, both, and/or another computer or detachable storage medium.

The data accumulated in the memory buffers are pushed at fixed intervals for further processing 140. The pushed data are packed and sent out as single images with header information for further processing 150. Like the previously discussed task, the pushing of the data 140 and the packing of the data 150, is accomplished in various embodiments of the present invention by hardware components and/or by a software routines, computer program instructions executed on a processor.

Figure 2:
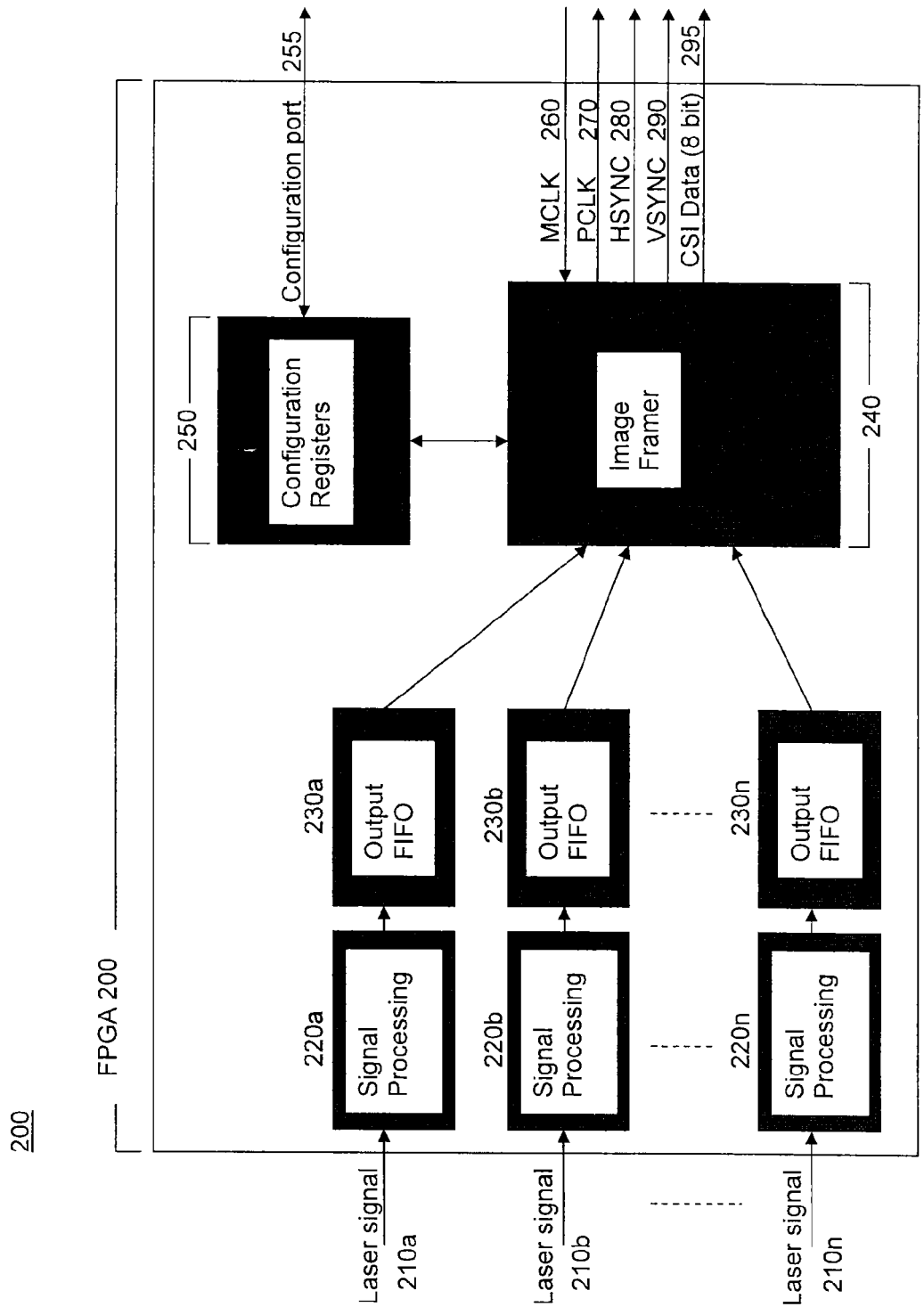
FIG. 2 depicts an embodiment of the present invention.

Referring the FIG. 2, an embodiment of the present invention utilizes a field-programmable gate array (FPGA) 200. An FPGA is an integrated circuit designed to be configured by the customer or designer after manufacturing; it derives its name because it is programmable in the field. The FPGA configuration is generally specified using a hardware description language (HDL), similar to that used for an application-specific integrated circuit (ASIC). FPGAs are used to implement logical functions. FPGAs contain programmable logic components called "logic blocks," and a hierarchy of reconfigurable interconnects that allow the blocks to be wired together in many different configurations. Logic blocks are be configured to perform both complex combinational functions and simple logic gates. In most FPGAs, the logic blocks also include memory elements.

Referring to FIG. 2, the laser channels 210a-210n are connected to corresponding signal processing blocks 220a-220n, logic blacks on the FPGA 200. The laser signal originates from the image capture device, including but not limited to an optical scanner, integrated into an EIR terminal, are received via the laser channels 210a-210n, when the EIR terminal is used to capture an image of decodable indicia, including but not limited to a bar code. The signal processing blocks 220a-220n, receive and process the data, which is stored in a corresponding first in first out (FIFO) memory buffers 230a-230n. As aforementioned, a logic block on an FPGA often includes a memory element.

In the embodiment of FIG. 2, logic blocks within the FPGA 200 are programmed to read the processed data from the memory buffers 230a-230n, package this data into image frames, and send the data to the processor by emulating a camera senor interface (CSI).

After the data is stored in the memory buffers 230a-230n, the Image Framer Block 240, another logic block in the FPGA 200, is responsible for reading the data from each of the memory buffers 230a-230n, packing this data into an image along with header information, and sending it to the processor. A set of configuration registers 250 can be used to set various parameters such as the image size/format, and the image rate. Because laser data is pushed from the external hardware to the decoding processor at fixed time intervals, this operation is a time driven operation in this embodiment. The configuration registers 250 can be adjusted via a configuration port 255.

The master clock (MCLK) 260 is a signal that provides that is used to divide the pixel clock (PCLK) 270 to assist the Image Framer Block 240 with the timing the delivery of the data.

Referring to FIG. 2, to utilize the CSI, the Image Framer Block 240 sends three types of digital signals that traditionally come from a digital camera: a data line, CSI Data 295, a PCLK 270, and enable lines, horizontal sync (HSYNC) 280 and vertical sync (VSYNC) 290. In this manner, the laser signal has been re-configured into a digital signal, produced by a digital camera, that can be processed by the CSI. The CSI includes but is not limited to, a microprocessor.

In the embodiment of FIG. 2, the CSI Data 295 is a data line, i.e., a parallel line that carries digital signals that correspond to pixel values; parallel data lines that carry pixel data. Image acquisition devices, such as digital cameras, represent one pixel with values, including but not limited to, 8 bits, 10 bits, 12 bits and/or 14 bits. Therefore, it takes 8, 10, 12, or 14 digital lines to represent one pixel. The number of lines per pixel is referred to as the pixel depth. In the embodiment of FIG. 2, the CSI Data 295 has a pixel depth of 8 bits. The data transmitted on these lines change with every Pixel Clock (PCLK).

The Image Framer Block 240 also produces a PCLK 270, a high frequency pulse train that determines when the data lines have valid data. The PCLK 270 determines the rates at which pixels are acquired. In a digital camera, the active edge of the pixel clock (which can be either the rising edge or the falling edge, depending on the device), the digital lines all have a constant value that is input into the image acquisition device, which latches in the data. The data changes to the next pixel value before the next active edge of the pixel clock, so that the next pixel value will get latched into the image acquisition device.

The Image Framer Block 240 also produces enable lines, HSYNC 280 and VSYNC 290. Enable lines are used to determine where the pixels are located in an image.

The HSYNC 280 indicates that one line of the frame is transmitted. The HSYNC 280 is active while an entire row of pixels is coming in. At the end of that row of pixels, the HSYNC 280 goes inactive until the beginning of the next row of pixels begins.

The VSYNC indicates when an entire frame is transmitted. The VSYNC 290 is active during the entire frame. After one frame is done, the signal goes inactive until the beginning of the next frame. Because this signal is transmitted after the entire frame is transferred, this signal is a way to indicate that one entire frame is transmitted.

Commercial image acquisition devices are designed to work with level-sensitive enable lines and edge-sensitive pixel clocks.

Figure 3:
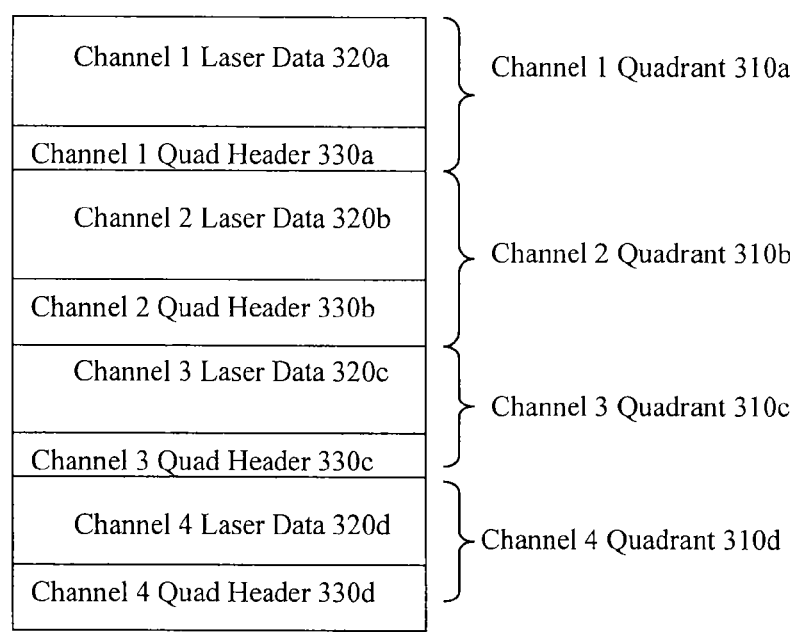
FIG. 3 depicts an embodiment of an aspect of the present invention.

FIG. 3 is an embodiment of a CSI frame 300 and depicts the details of the layout of this embodiment of the CSI frame 300. Referring to the embodiment of FIG. 2, by way of example, after reading the data from the memory buffers 230a-230n, the Image Framer Block 240 packs the data into images with header information to send it to the processor using the configuration set by the configuration registers 250. FIG. 3 depicts an example of a portion of format used to pack laser data into an image, i.e. a CSI frame 300.

In the CSI frame 300, the laser data is packed into quadrants, also called sub-frames. Inside each quadrant, the laser data is packaged into well defined image frames along with the header information, allowing the processor to identify quickly if the data should be processed and if so, which elements should be processed together.

Referring to FIG. 3, CSI frame 300 is divided into four CSI channel quadrants, Channel 1 Quadrant 310a, Channel 2 Quadrant 310b, Channel 3 Quadrant 310c, and Channel 4 Quadrant 310d. Each quadrant is a fixed sub-frame corresponding to a channel of laser data such as laser channels 210a-210n in FIG. 2. The number of quadrants is meant as an example and additional embodiments utilize both fewer and more quadrants.

In the embodiment of FIG. 3, the size of each CSI frame 300 is fixed, and the size and location of each sub-frame, quadrants 310a-310d, are also both fixed. In addition to housing laser data from a corresponding channel, each quadrant has a header. For example, channel 1 quadrant 310a is comprised of laser data 320a from the first channel and a header 330a. The fixed position of the headers 330a-330d are easily recognized and read by software, computer code, executed on a processor, informing the decoding operation. The fixed structure of the CSI frame 300 and the sub-frames, quadrants 310a-310d, is conducive to pushing the laser data to the decoding processor at fixed intervals.

In an embodiment of the present invention, because the data is pushed at fixed intervals, and not when a certain threshold is met. Thus, if the quantity of data read from memory is insufficient to file a given quadrant 310a, the space of the unfilled quadrant 310a will be filled with special characters. Special characters utilized include but are not limited to the digit 0.

Figure 4:
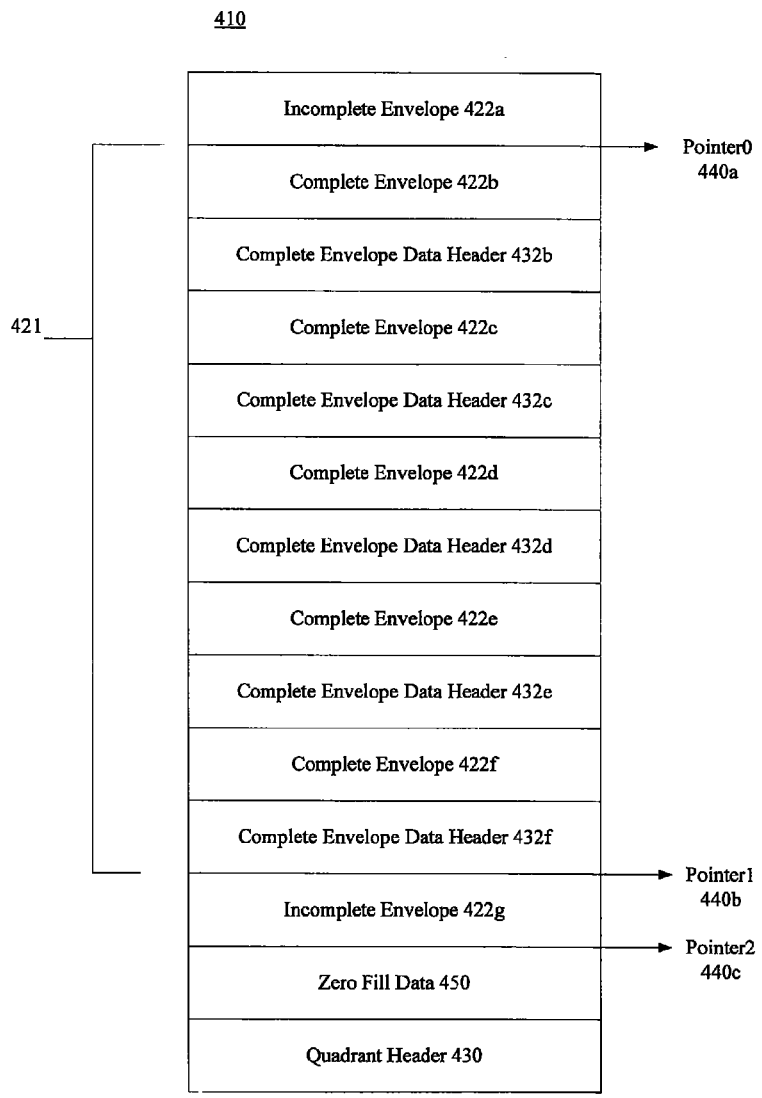
FIG. 4 depicts an embodiment of an aspect of the present invention.

FIG. 4 is an embodiment of a sub-frame, a quadrant 410. This quadrant 410 is a detailed view of an exemplary quadrant, such as one of quadrants 310a-310d, in FIG. 3. Quadrant 410 contains laser data 420 and a header 430. The header 430 information allows the processor to identify quickly if the data should be processed and if so, which elements should be processed together. The information in the header 430 includes, but is not limited to, information about the channels, the envelope, and the edges in a given quadrant 410. Specific information in the header 430 includes but is not limited to the number of bytes of edge data, and the envelope counts.

In an embodiment of the present invention, for ease of location, the address of the header 430 is fixed.

Referring to FIG. 4, the header 430 contains references to data pointers 440a-440c that provide envelope 422a-422g information. The number of total envelopes is referenced in the header 430. Envelopes 422b-422e are complete and are trailed by complete envelope data headers 432b-432e, which like the header 430, indicate information regarding the content of their respective envelopes, including but not limited to, the number of bytes of data. Envelope 422a and envelope 422g are incomplete. Pointers 440a-440c are referenced in the header 430 and indicate the beginning and end of the envelope regions. Pointer0 440a indicates the start of a full envelope 422a. Pointer1 440b indicates the beginning of a trailing partial envelope 422g. As discussed in referenced to FIG. 3, the fixed space allotted to the quadrant 410 is filled with a special character, in this case, "0." The start of this zero filled data region 450 is indicated by a pointer, pointer2 440c, which is referenced in the header 430.

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", an and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiment with various modifications as are suited to the particular use contemplated.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

The invention claimed is:

1. A computer system for decoding a signal of decodable indicia, the computer system comprising:
   a laser scanner configured to output a signal of decodable indicia;
   a memory configured to receive said signal of decodable indicia from said laser scanner;
   a processor configured to read said signal of decodable indicia from said memory at equal pre-determined time intervals and to pack said signal of decodable indicia into at least one image frame; and
   a microprocessor comprising a camera sensor interface configured to receive said signal of decodable indicia from said laser scanner.

2. The computer system of claim 1, wherein said at least one image frame comprises header information.

3. The computer system of claim 1, further comprising:
   a configuration register coupled to said memory wherein said configuration register sets parameters for said at least one image frame.

4. The computer system of claim 3, wherein said parameters include one or more of: image size, image format, and image rate.

5. The computer system of claim 1, said processor is further configured to produce digital signals while packing said signal of decodable indicia into said at least one image frame, wherein said digital signals comprise a data line, a pixel clock, a horizontal sync enable line, and a vertical sync enable line.

6. The computer system of claim 1, wherein said at least one image frame block is of a fixed size and wherein said at least one image frame is comprised of envelopes, and wherein said header information comprises references to data pointers within said envelopes.

7. The computer system of claim 1, wherein said decodable indicia is provided by at least one of: a 1D bar code, a 2D bar code, and one or more OCR symbols.

8. The computer system of claim 1, wherein said memory is a FIFO memory buffer.

9. A method for decoding a signal of decodable indicia, the method comprising the steps of:
  a computer receiving a signal of decodable indicia from a client wherein said client is provided by an optical reading device configured to output said signal of decodable indicia;
  said computer, responsive to receiving said signal of decodable indicia, storing in at least one memory buffer;
  said computer reading said signal of decodable indicia from said at least one memory buffer at pre-determined time intervals;
  said computer packing said signal of decodable indicia into at least one image frame;
  said computer receiving said at least one image frame;
  said computer, responsive to receiving said at least one image frame, locating said decodable indicia in said signal of decodable indicia in said at least one image frame; and
  said computer decoding said decodable indicia into a decoded message.

10. The method of claim 9, further comprising:
  said computer setting parameters for said at least one image frame.

11. The method of claim 10, wherein said parameters include one or more of:
  image size, image format, and image rate.

12. The method of claim 9, further comprising:
  said computer producing digital signals while packing said signal of decodable indicia into said at least one image frame, wherein said digital signals comprise a data line, a pixel clock, a horizontal sync enable line, and a vertical sync enable line.

13. The method of claim 9, wherein said signal of decodable indicia is a laser signal.

14. The method of claim 9, wherein said decodable indicia is provided by at least one of: a 1D bar code, a 2D bar code, and one or more OCR symbols.

15. A computer program product for decoding a signal of decodable indicia, the computer program product comprising:
  one or more computer-readable tangible storage devices;
  program instructions, stored on at least one of the one or more storage devices, to receive a signal of decodable indicia from a client wherein said client is provided by an optical reading device configured to output said signal of decodable indicia;
  program instructions, stored on at least one of the one or more storage devices to, responsive to receiving said signal of decodable indicia, store said signal of decodable indicia in at least one of said computer-readable tangible storage devices at equal pre-determined time intervals;
  program instructions, stored on at least one of the one or more storage devices, to read said signal of decodable indicia from said at least one of said computer-readable tangible storage devices;
  program instructions, stored on at least one of the one or more storage devices to pack said signal of decodable indicia into at least one image frame;
  program instructions, stored on at least one of the one or more storage devices to receive said at least one image frame;
  program instructions, stored on at least one of the one or more storage devices to, responsive to receiving said at least one image frame, locate said decodable indicia; and
  program instructions, stored on at least one of the one or more storage devices to decode said decodable indicia.

16. The computer program product of claim 15, wherein said at least one image frame comprises header information.

17. The computer program product of claim 15, further comprising:
  at least one configuration register coupled to said at least one of said computer-readable tangible storage devices wherein said least one configuration register sets parameters for said at least one image frame.

18. The computer program product of claim 17, wherein said parameters include one or more of: image size, image format, and image rate.

19. The computer program product of claim 15, further comprising program instructions, stored on at least one of the one or more storage devices, to produce digital signals while packing said signal of decodable indicia into said at least one image frame, wherein said digital signals comprise a data line, a pixel clock, a horizontal sync enable line, and a vertical sync enable line.

* * * * *